United States Patent
Black et al.

[11] Patent Number: 6,112,578
[45] Date of Patent: Sep. 5, 2000

[54] MULTIPLE CAVITY LEAK TEST PROCESS

[75] Inventors: Gregg T. Black, Livonia; Michael C. Lefebvre, West Bloomfield, both of Mich.

[73] Assignee: DaimlerChrysler Corporation, Auburn Hills, Mich.

[21] Appl. No.: 09/299,547

[22] Filed: Apr. 26, 1999

[51] Int. Cl.$^7$ .............. G01M 3/32; G01M 3/26; F02M 37/04
[52] U.S. Cl. .................. 73/40; 73/49.2; 73/37
[58] Field of Search .............. 73/40, 49.2, 40.5 R, 73/37

[56]       References Cited

U.S. PATENT DOCUMENTS

| | | | |
|---|---|---|---|
| 3,213,673 | 10/1965 | Schulhoff, Sr. | 73/49.2 |
| 3,331,238 | 7/1967 | Kost et al. | 73/49.5 |
| 3,433,079 | 3/1969 | Wilson | 73/49.8 |
| 3,871,209 | 3/1975 | Hasha | 73/49.1 |
| 4,027,513 | 6/1977 | DeMent et al. | 73/49.8 |
| 4,126,034 | 11/1978 | Conrad | 73/49.2 |
| 4,136,552 | 1/1979 | Hasha | 73/46 |
| 4,171,636 | 10/1979 | Bergeron | 73/49.7 |
| 4,272,985 | 6/1981 | Rapson, Jr. et al. | 73/49.2 |
| 4,441,357 | 4/1984 | Kahn et al. | 73/40 |
| 4,487,226 | 12/1984 | Chun | 138/30 |
| 4,617,824 | 10/1986 | Cybulski et al. | 73/49.7 |
| 4,670,847 | 6/1987 | Furuse | 364/507 |
| 4,766,934 | 8/1988 | Ollivaud et al. | 138/90 |
| 4,776,206 | 10/1988 | Armstrong et al. | 73/40 |
| 4,840,058 | 6/1989 | Cohen | 73/40 |
| 4,860,575 | 8/1989 | Robinson | 73/49.7 |
| 4,899,573 | 2/1990 | Dimmick et al. | 73/49.2 |
| 4,953,396 | 9/1990 | Langsford et al. | 73/49.3 |
| 4,993,256 | 2/1991 | Fukuda | 73/49.2 |
| 5,279,147 | 1/1994 | Bertini et al. | 73/40 |
| 5,367,797 | 11/1994 | Zaim | 73/49.2 |
| 5,412,978 | 5/1995 | Boone et al. | 73/49.2 |
| 5,546,789 | 8/1996 | Balke et al. | 73/40 |
| 5,635,630 | 6/1997 | Dawson et al. | 73/40.5 R |
| 5,651,350 | 7/1997 | Blomquist et al. | 123/520 |

*Primary Examiner*—Hezron Williams
*Assistant Examiner*—J. David Wiggins
*Attorney, Agent, or Firm*—Kenneth H. Maclean

[57]         ABSTRACT

A method and apparatus for leak testing a first and a second cavity of a part. A fixture is provided for engaging and individually sealing the cavities of the part. Pressurized fluid from a pressure source is introduced into each of the cavities. The first cavity is allowed to stabilize and its leak rate is measured using a pressure-measuring device. The first cavity is then vented. Upon stabilization of the second cavity, the leak rate thereof is similarly measured. The second cavity is then also vented. The leak rates are then evaluated to determine if a leak is present in either of the cavities.

4 Claims, 2 Drawing Sheets

MULTIPLE CAVITY LEAK TEST PROCESS

FIELD OF THE INVENTION

The present invention relates to a method and apparatus for leak testing and, more particularly, to a method and apparatus for pressure decay leak testing capable of simply and efficiently testing parts having multiple cavities.

BACKGROUND OF THE INVENTION

As is well known in the art, many automotive, industrial, and medical components are required to successfully pass a leak check inspection prior to assembly and use thereof. Commonly, this leak check inspection is performed by measuring pressure decay. Pressure decay provides a quantitative measure of the leak rate in cubic centimeters per minute ($cm^3/min$), which may be compared with an acceptable range of leak rates. Typically in automotive applications, the leak check inspection is performed on components that maintain a pressure or vacuum state during use, such as cylinder heads, cylinder blocks, transmission cases, valve covers, valve bodies, intake manifolds, exhaust manifolds, and headlight assemblies. It should be appreciated that the cost and time required to conduct leak check inspections of these components may be excessive.

In known pressure decay testing processes, a part to be tested is clamped to a testing fixture such that all fixture openings are fluidly sealed to define a sealed internal cavity or volume. The testing and clamping fixtures are custom made to fit the part being tested. Gas, such as air, is then introduced into the sealed cavity to a known pressure. The pressurized cavity is then allowed to stabilize prior to testing. That is, pressure is maintained at the known pressure for a predetermined length of time. During this time, the temperature and pressure of the fixture, seals, clamps, and part is allowed to reach equilibrium, also known as stabilization. It should be appreciated that the time required for the fixture and related components to reach this equilibrium is directly proportional to the size of the cavity being tested; that is, a larger cavity has a higher heat capacity and, thus, requires longer time to stabilize relative to a smaller cavity.

Once the temperature and pressure of the fixture and related components are stabilized, the part is maintained at the stabilized state and the pressure of the cavity is accurately measured over time. The leak rate out of the pressurized cavity is then calculated by dividing the pressure drop in the cavity ($\Delta P$) by the measured length of time ($\Delta T$). It is assumed that any measured pressure drop in the cavity is attributable to a leak being present in an exposed wall in the part. An exposed wall is defined as a wall that is subjected to a pressure gradient. Finally, the tested cavity is vented to the atmosphere and the test is completed. This testing process may then be repeated for a second part.

For most components produced in large quantities, the pressure decay process requires automated part handling equipment such as transfer lines, robotic manipulation, and/or similar techniques to maintain production levels due to the long test cycle times and single part testing procedures. This automated handling equipment, however, is typically expensive and complex. By way of an example, a typical testing station with a transfer line, sealing rams, and clamping fixtures may cost approximately $200,000. Parts having multiple cavities to be testes would require an additional testing station for each cavity, thereby compounding the cost. Notwithstanding, there is also the additional cost of providing floor space sufficient to accommodate the various testing stations throughout the life of the product.

In an attempt to decrease the cycle time required to perform the testing of a part having multiple cavities, another known pressure decay process employs a single testing station and fixture. If there are no shared walls between the cavities being tested, then the cavities can be tested in parallel without compromise. If there are shared walls, the pressure decay testing process described above is simply repeated in series for each of the multiple cavities. That is, the above described pressure decay process is first completed in its entirety for a first cavity and then completed in its entirety for a second cavity. This insures that any wall shared by adjacent cavities are correctly leak tested because each cavity is tested wholly independent from the other, thus insuring the shared wall is subjected to the correct pressure gradient. It should be appreciated that the cycle time for leak testing multiple cavities reduces the number of parts that can be tested.

Accordingly, there exists a need in the relevant art to provide a method and apparatus for pressure leak testing a part having multiple cavities that overcomes the disadvantages of the prior art. Furthermore, there exists a need in the relevant art to provide a multiple cavity leak test method and apparatus that is capable of minimizing the cycle time associated therewith. Still further, there exists a need in the relevant art to provide a multiple cavity leak test method and apparatus capable of minimizing the cycle time investment and floor space required for testing.

SUMMARY OF THE INVENTION

In accordance with the broad teachings of this invention, an advantageous method and apparatus for pressure leak testing a part having multiple cavities are provided.

The method and apparatus of leak testing comprises first providing a part to be tested, wherein the part includes a first and a second cavity having a shared wall therebetween. A fixture is then provided for engaging and individually sealing the cavities of the part. Pressurized fluid from a pressure source is then introduced into each of the cavities. The first cavity is allowed to stabilize and then its leak rate is measured using a pressure-measuring device. The first cavity is then vented. Upon stabilization of the second cavity, the leak rate thereof is similarly measured. The second cavity is then also vented.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For example, the method and apparatus disclosed herein may have utility in pressure testing any multiple cavity parts. Furthermore, the method may have utility in reducing test cycle times of other testing methods, such as in mass flow testing, accelerated laminar flow testing, and differential pressure testing.

Figure 1:
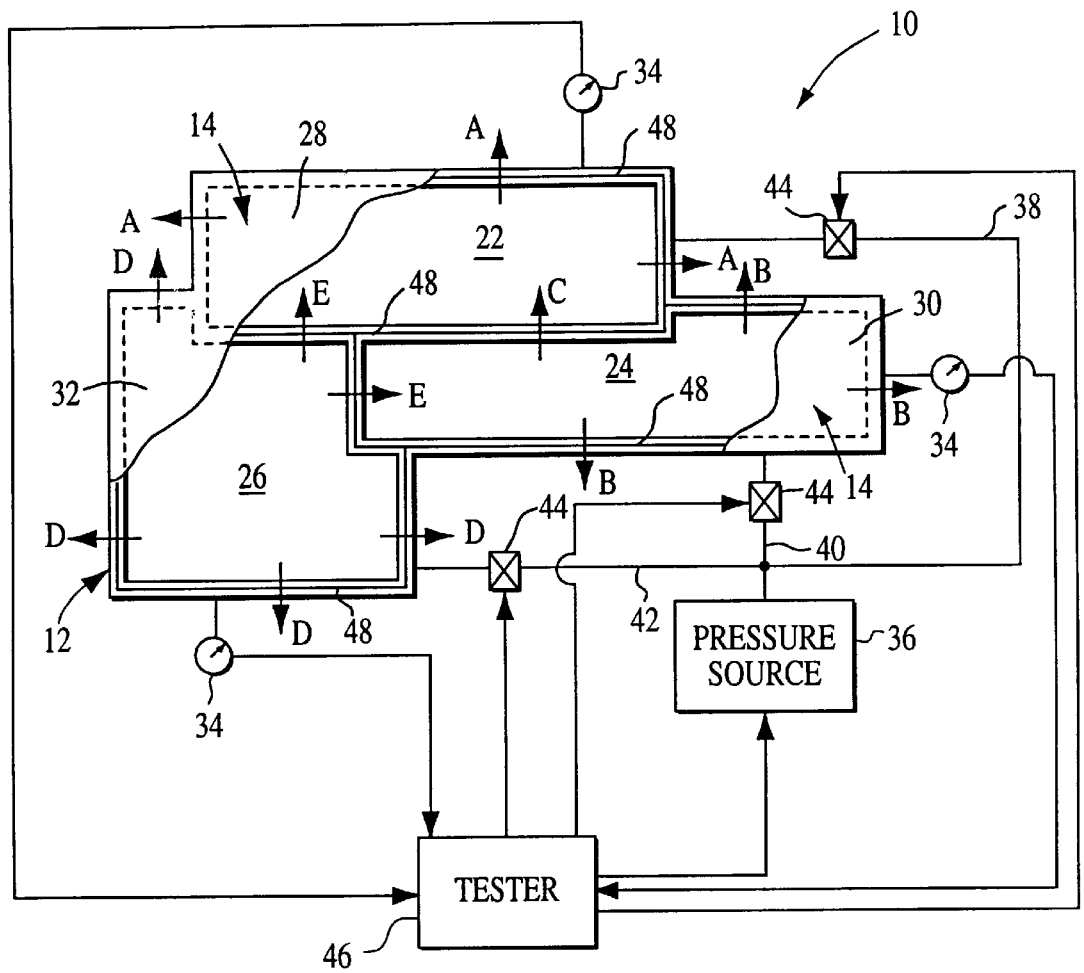
FIG. 1 is a partial schematic diagram illustrating an apparatus for pressure leak testing multiple cavities of a part in a single cycle according to the present invention.
Figure 2:
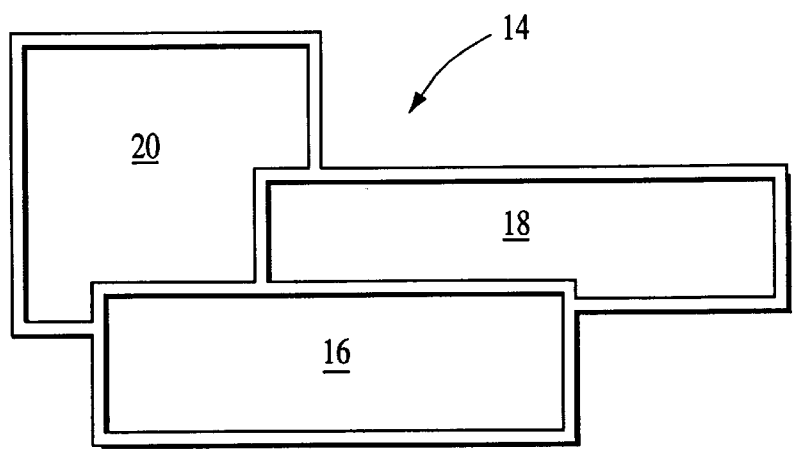
FIG. 2 is a bottom view of the part having at least three cavities.

Referring to FIGS. 1 and 2, a pressure leak test assembly 10 is shown having a fixture 12 for receiving a part 14 thereon. Pressure leak test assembly 10 is adapted to perform a pressure decay leak test according to the testing procedure of the present invention. As best seen in FIG. 2, part 14 includes a first cavity or chamber 16, a second cavity or chamber 18, and a third cavity or chamber 20, which all have shared walls extending therebetween. Part 14 may be a casted part, such as a cylinder head for an engine of a vehicle, that must maintain an internal pressure or vacuum during operation. In this cylinder head example, the first cavity 16, second cavity 18, and third cavity 20 may be the water jacket, porting passages, and oil cavity, respectively.

It should be appreciated that parts having two or more cavities with shared walls therebetween may be tested in a single cycle by the method and apparatus of the present invention. Similarly, parts having any number of cavities may also be tested in a single cycle according to the present invention simply by repeating selected portions of the testing procedure. However, in the interest of brevity and completeness, only parts having three cavities will be discussed in detail unless otherwise noted.

Referring back to FIG. 1, fixture 12 includes a first cavity or chamber 22, a second cavity or chamber 24, and a third cavity or chamber 26 that closely conform to first cavity 16, second cavity 18, and third cavity 20 of part 14 for sealing engagement therewith. Specifically, cavities 22, 24, 26 are arranged such that when part 14 is mounted to fixture 12, cavities 22, 24, 26 of fixture 12 cooperate with cavities 16, 18, 20 of part 14 to define respective enclosed cavities or volumes 28, 30, 32. Fixture 12 further includes a plurality of pressure transducers or gauges 34 each disposed in volumes 28, 30, 32 for measuring an internal pressure therein.

Still referring to FIG. 1, pressure leak test assembly 10 further includes a pressure source 36, such as a compressor or pump, operably coupled to each of the volumes 28, 30, 32 via respective passages 38, 40, 42. Pressure source 36 selectively introduces a pressurized fluid, such as air, into each of the volumes 28, 30, 32 to a predetermined pressure. Pressure leak test assembly 10 still further includes an isolating device 44, such as a valve or other suitable means, disposed in each of the passages 38, 40, 42 for isolating and sealing each of the volumes 28, 30, 32 from pressure source 36.

A tester 46 is electrically coupled to pressure source 36, each isolating device 44, and each pressure gauge 34 of assembly 10. Tester 46 is adapted to automatically control pressure source 36 and isolating devices 44 to simply and conveniently complete the leak test of the present invention. Tester 46 is preferably a central processing unit. Tester 46 is also adapted to measure a pressure indicated by each pressure gauge 34 relative to time. Tester 46 can thus calculate a leak rate of each volume 28, 30, 32 as the quotient of a pressure loss ($\Delta P$) over a measured length of time ($\Delta T$).

During assembly, part 14 is mounted to fixture 12 using a plurality of clamps (not shown) disposed about the periphery of fixture 12. Part 14, thus, engages a seal 48 formed on the outer edges of fixture 12. Seal 48 is provided for insuring each volume 28, 30, 32 is individually airtight relative to adjacent volumes and the atmosphere. Preferably, the handling and assembly of part 14 is automated such that transfer lines, robotic manipulation, or similar means are improved to further increase the throughput of the parts being tested.

Figure 3:
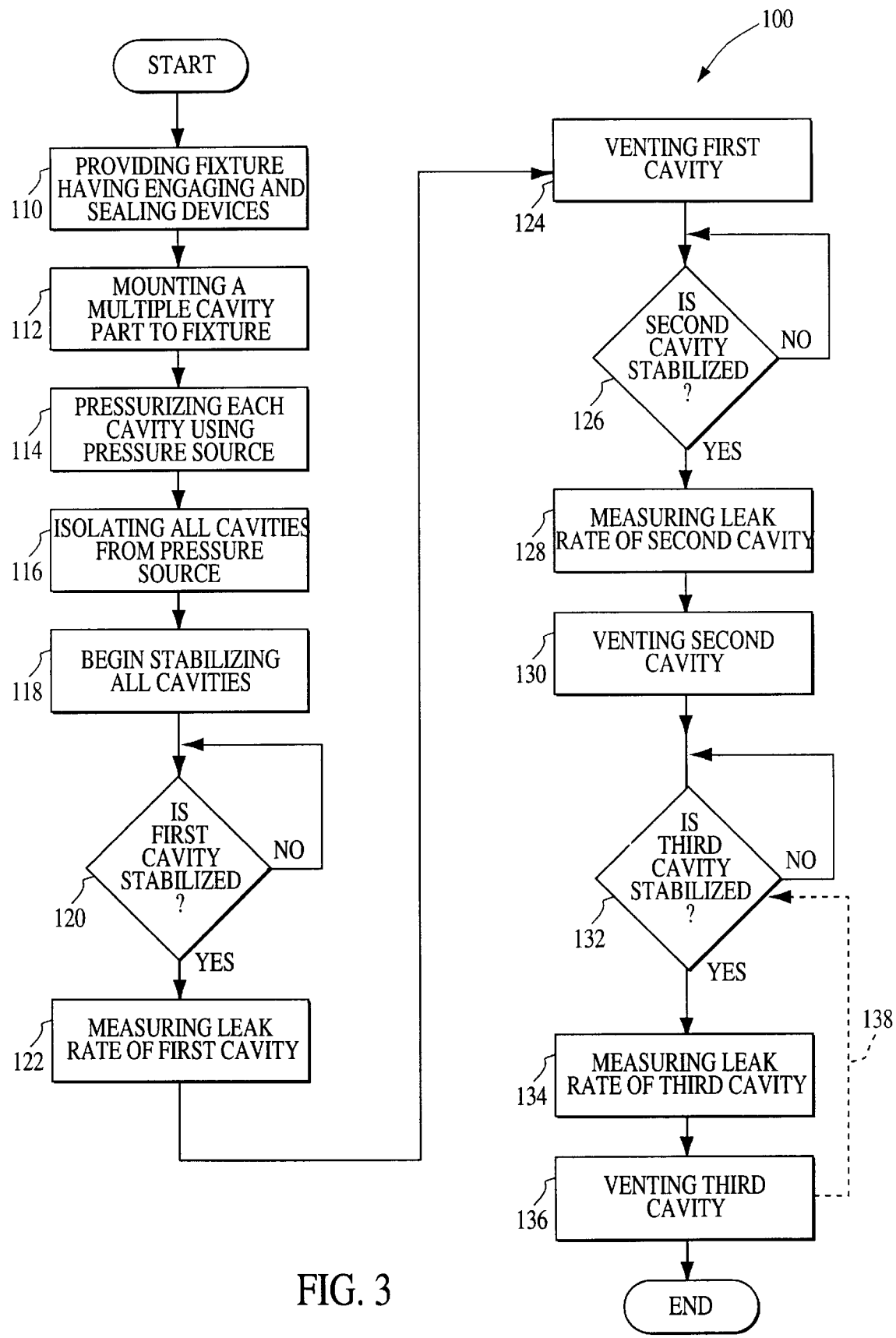
FIG. 3 is a flow chart diagram illustrating the step involved in pressure leak testing multiple cavities of the part according to the present invention.

Referring now to a flowchart 100 illustrated in FIG. 3, a preferred method of leak testing a part having multiple cavities will be discussed. At step 110, fixture 12, having cavities 22, 24, 26, is provided. At step 112, part 14, having cavities 16, 18, 20, is mounted to fixture 12 such that cavities 22, 24, 26 of fixture 12 cooperate with cavities 16, 18, 20 to define test cavities 28, 30, 32. Seal 48 provides an airtight seal for test cavities 28, 30, 32. At step 114, pressure source 36 introduces pressurized fluid into each test cavity 28, 30, 32 via respective passages 38, 40, 42 in response to a signal received from tester 46. At step 116; isolating devices 44 are closed in response to a signal received from tester 46 such that test cavities 28, 30, 32 are isolated from pressure source 36. It should be appreciated that isolating devices 44 may be eliminated depending upon the sealing ability of pressure source 36 and/or the expected leak rate of the test cavities.

At step 118, test cavities 28, 30, 32 are allowed to stabilize to insure the pressure and temperature of fixture 12, part 14, seal 48, and any other components are able to reach an equilibrium state. It has been found that smaller cavities typically stabilize more quickly than larger cavities. Therefore, once first test cavity 28 is confirmed to be stabilized, generally at step 120, tester 46 begins monitoring the pressure decay or loss in first test cavity 28 over time via a signal received from pressure gauge 34 disposed in first test cavity 28. It should be appreciated that during the time necessary for tester 46 monitor the pressure decay in first test cavity 28, remaining test cavities 30, 32 are allowed to continue to stabilize. This method is useful for cavities of varying size, since larger cavities typically require more time to stabilize than smaller cavities. Thus, the smaller cavities may be tested while the larger cavities are stabilizing. Once the leak test of first test cavity 28 is completed, first test cavity 28 is vented to a known pressure, such as atmosphere, at step 124.

At step 126, second test cavity 30 is verified to be stabilized prior to testing. At step 128, tester 46 begins monitoring the pressure decay or loss in second test cavity 30 over time via a signal received from pressure gauge 34 disposed in second test cavity 30. Once the leak test of second test cavity 30 is completed, second test cavity 30 is vented to the known pressure at step 130. Likewise, at step 132, third test cavity 32 is verified to be stabilized prior to testing. At step 128, tester 46 begins monitoring the pressure decay or loss in third test cavity 32 over time via a signal received from pressure gauge 34 disposed in third test cavity 32. Once the leak test of third test cavity 32 is completed, third test cavity 32 is vented to the known pressure at step 130.

It should be appreciated that in order to test additional cavities in part 14, selected portions of the testing procedure are simply repeated during the single testing cycle, generally indicated at 138. That is, for an $n^{th}$ test cavity, $n^{th}$ test cavity is verified to be stabilized prior to testing. Tester 46 begins monitoring the pressure decay or loss in $n^{th}$ test cavity over time via a signal received from a pressure gauge disposed in $n^{th}$ test cavity. Once the leak test of $n^{th}$ test cavity is completed, $n^{th}$ test cavity is vented to the known pressure. This process is repeated for any remaining cavities.

From the foregoing discussion, it should be understood that the method of the present invention enables each cavity to be leak tested, including those walls that are shared between adjacent cavities. Specifically, with reference to FIG. 1, during the testing of first test cavity 22, the walls of first test cavity 22 that are exposed to atmosphere, generally indicated by arrows A, are tested. The walls of first test cavity 22 that are shared with the adjacent test cavities 24, 26 are not tested because there is no pressure gradient existing therebetween. During the testing of second test cavity 24, the walls of second test cavity 24 that are exposed to atmosphere, generally indicated by arrows B, are similarly tested, However, since first test cavity 22 has previously been vented, the walls shared between first test cavity 22 and second test cavity 24, generally indicated with arrows C, will also be leak tested. Likewise, during the testing of third test cavity 26, the walls of third test cavity 26 that are exposed to atmosphere, generally indicated with arrows D, and the walls shared between third test cavity 26 and now vented test cavities 22, 24, generally indicated with arrows E, are also leak tested.

It is anticipated that should it become necessary to determine which shared wall leaks, adjacent test cavities may be selectively repressurized to minimize the number of shared walls opposed to the pressure gradient.

By way of non-limiting example, it has been found that individually testing each cavity of a casted cylinder head according to the prior art method typically requires approximately 63 seconds. On the other hand, individually testing each cavity of the same casted cylinder head according to the method of the present invention typically requires approximately 33 seconds, thereby providing a 48% reduction in cycle times.

The method and apparatus for pressure decay leak testing of the present invention enables a part having multiple cavities to be simply and conveniently tested during a single test cycle, thereby minimizing the time necessary for testing each part. The method and apparatus of the present invention further enables shared walls between adjacent cavities to be leak tested. The method and apparatus of the present invention still further minimizes the cost and floor space associated therewith due to the increased throughput of the testing assemblies.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:
1. A method of leak testing a part comprising the steps of:
providing a fixture;
mounting a part to be tested to said fixture, said fixture cooperating with said part to define and seal a first, a second, and a third cavity;
introducing pressurized fluid from a pressure source into each of said cavities;
begin stabilizing said first and second cavities;
measuring a leak rate of said first cavity upon stabilization of said first cavity;
venting said first cavity;
measuring a leak rate of said second cavity upon stabilization of said second cavity; and
venting said second cavity;
measuring a leak rate of said third cavity upon stabilization of said third cavity; and
venting said third cavity.
2. The method of leak testing according to claim 1 wherein said third cavity defines a third volume, said third volume being larger than said first and second volumes.
3. A method of leak testing a part comprising the steps of:
providing a fixture;
mounting a part to be tested to said fixture, said fixture cooperating with said part to define and seal a first, a second, and a third volume;
introducing pressurized air from a pressure source into each of said volumes simultaneously;
isolating said pressure source from said volumes;
begin stabilizing said first, second, and third volumes;
measuring a leak rate of said first volume upon stabilization of said first cavity;
venting said first volume to atmosphere;
measuring a leak rate of said second volume upon stabilization of said second cavity; and
venting said second volume to atmosphere; measuring a leak rate of said third volume upon stabilization of said third cavity; and
venting said third volume to atmosphere.
4. The method of leak testing according to claim 3 wherein said third volume is larger than said first and second volumes.

* * * * *